Jan. 14, 1936.  H. J. BERNHARD  2,027,626
ATTACHMENT FOR TIRE CHANGING MACHINES
Filed Dec. 26, 1934
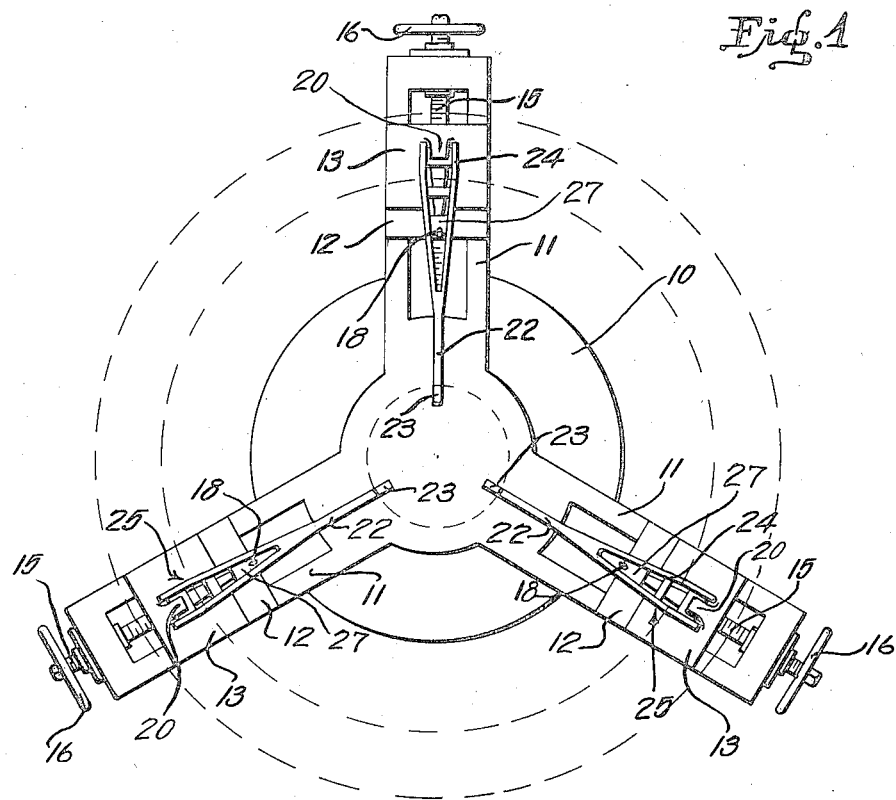
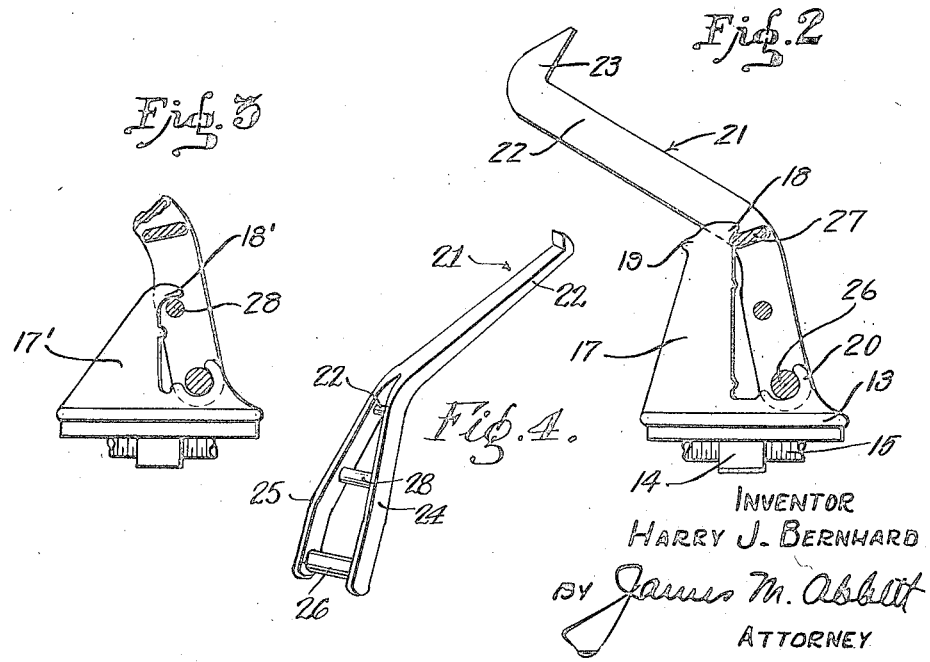
INVENTOR
HARRY J. BERNHARD
BY James M. Abbott
ATTORNEY Patented Jan. 14, 1936

2,027,626

UNITED STATES PATENT OFFICE 2,027,626

ATTACHMENT FOR TIRE CHANGING MACHINES

Harry J. Bernhard, Pasadena, Calif.

Application December 26, 1934, Serial No. 759,227

4 Claims. (Cl. 144—288)

This invention relates to tire changing machines and particularly pertains to a wheel attachment therefor.

In recent years various types of tire changing machines have been developed for shop use. These machines are designed to grip an automobile wheel and to hold the wheel securely while a tire is being removed therefrom or applied thereto. These devices also contemplate providing expanding and contracting means acting upon the tire frame. In the last year the designs of automobile wheels have changed from the artillery wheel having a demountable tire rim to wire wheels having a permanent rim, and it has been found that the usual tire changing machines are not adapted to receive and hold wire wheels, and furthermore when provided with adapting means are liable to scar the painted surface of the wheels. It is the principal object of the present invention to provide a simple set of attaching arms which may interlock with the gripping and expanding members of the machines without the use of bolts, nuts, or other fastening means, and which will satisfactorily align themselves with the wheel elements as the tightening operation is carried on, and in a manner to securely grip and rigidly support a wheel for such operations as may be necessary, said attachment structure being capable of instant removal from their interlocked positions.

The present invention contemplates the provision of a set of gripping arms which may be separately applied to the several arms or gripping and clamping blocks of the tire changing machine, the attachment members being designed to interlock with parts of the gripping arms or blocks of tire changing machines now in use so that when pressure is applied to the blocks the attachment members will assume a rigid interlocked position with the blocks and will rigidly grip a wheel mounted upon the attachment members.

The invention is illustrated by way of example in the accompanying drawing in which:

Figure 1 is a view in plan indicating generally a tire changing machine of common construction and upon which the attachment members are applied, an automobile wheel being indicated in dotted lines.

Fig. 2 is a view in side elevation showing a tire changing block of common construction to which one of the attachment members has been applied.

Fig. 3 is a fragmentary view in side elevation showing another form of tire changing block to which the attachment member has been applied.

Fig. 4 is a view in perspective showing the attachment member.

Referring more particularly to the drawing 10 indicates the pedestal portion of a tire changing machine at the top of which a plurality of radial arms 11 are supported. These arms are here shown as being three in number and formed with parallel ways 12 adapted to receive sliding blocks 13. These blocks slide along the ways and have downwardly projecting lugs 14 beneath them to receive operating screws 15. These screws extend through the end of the radial arms 11 and are there fitted with hand wheels 16 or other operating means. In tire changing machines of this particular type the blocks 13 are formed with upright jaws 17. In certain models of these machines these uprights are of considerable length as shown in Fig. 2. In other models they are shorter as indicated at 17' in Fig. 3. The upper ends of these jaws have an overhanging lip 18 or 18' at their outer edges and an overhanging lip 19 at their inner edges. These lips are designed to be used in contracting or expanding various members gripped between the uprights of the several blocks. At the base of the uprights 17 and 17' a semi-circular hook 20 is provided. This is in spaced relation to the base for various useful purposes on the tire changing machine. In the present instance attachment arms 21 are provided to interlock with the uprights and the hook members of the blocks 13. These attachment members comprise a longitudinally extending arm portion 22 which terminates at its free end in a hook 23. As shown in the plan view, Fig. 1, the member 22 is bifurcated to provide a pair of arms 24 and 25 which extend in divergent directions from the longitudinal center of the member 21 and then extend parallel to each other at their terminating ends. Adjacent their terminating ends a cross pin 26 is placed. It is understood that the attachment arms 21 may be cast, drop-forged, or otherwise made. In certain instances the cross pins 26 will be formed integral with the arms. By reference to Fig. 2 of the drawing it will also be seen that the divergent members 24 and 25 are bent at an angle to the longitudinal center of the arm portions 22. Substantially at the point of the bend a cross web 27 is formed between the arm portions 24 and 25. The distance from the cross pin 26 to the cross web 27 is such as to insure that when the cross pin 26 is positioned within the arcuate hooked seat 20 of the block the cross web 27 will be positioned under the lip 18 of an upright 17. Thus when the hook 23 has engaged the inner face of a cylindrical member such as the hub of a wheel and when the block has moved outwardly pressure will be exerted tending to force the web 27 against the upright 17 and from the fulcrum afforded by engagement of the cross pin 26 with the arcuate hooked seat of the block. By this arrangement the attachment arm 21 will automatically interlock with the structure of the block 13 and will remain rigid therewith during operation. When a tire changing machine of the type having the short upright 17' is used, as shown in Fig. 3, it will be seen that the upright is formed with an overhanging lip 18' which may engage a transverse pin 28 disposed at an appropriate distance between the pin 26 and the web 27 of the attachment arm. Thus the attachment arm may be interchangeably applied to machines of both types shown in Figs. 2 and 3.

In operation of the present invention the attachment arms are constructed as particularly shown in Fig. 4 of the drawing. The tire changing tool may be used in its intended manner for the usual purposes, but when it is desired to support a wheel of the wire wheel type the arms 21 are disposed in engagement with the arcuate hooked seats 20 and uprights 17 or 17' as shown in Figs. 1, 2, and 3. The wheel may then be mounted with its hub embracing the hooked points 23 of the attachment arms 21. It will be recognized that since these hooks engage the inner face of the hubs there will not be any tendency for the hubs to be marred by the operation. It will also be evident that due to the formation of the attachment portion as particularly indicated in Fig. 2, a hub and its wheel will be supported above the tire changing machine so that free access may be had to all sides of the wheel as it is rigidly gripped and held in a horizontal plane. When the operating screws 15 are rotated by the member 16 to move the blocks 13 in an outward direction the hook portions 23 will engage the wall of the hubs and firmly hold the wheel. Attention is directed to the fact that since the attachment arms are in a relatively loose position upon the abutments of the blocks 13 it is not necessary to take care in accurately setting these hooks with relation to the wheel hub, since the strain on the hooks and the hub will cause the hooked portions to slip until a uniform tension has been applied and will tend to cause the arms to assume equally spaced positions with relation to each other within the wheel hub. When it is desired to release the wheel the blocks 13 are moved to their innermost positions by rotation of the adjusting screws 15 so that the strain applied to the attachment arms will be relieved. The wheel may then be removed and if desired the attaching members may be instantly lifted from their previously seated positions on the blocks 13.

It will thus be seen that the structure here disclosed while quite simple and inexpensive in construction, provides a convenient means whereby types of tire changing machines now in use in connection with artillery type wheels may be adapted instantly for use in gripping and supporting wheels of the wire wheel type, and that after use the attachment arms may be instantly removed without manipulation of any fastening means.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. In combination with a tire changing machine having movable gripping blocks thereon, said blocks being characterized as having an upright member and a hook-shaped base lug, disposed outmost with relation to the upright, an attachment arm adapted to overhang the upright and to be engaged by the lug and to interlock with said lug at the base thereof.

2. In combination with a tire changing machine having movable gripping blocks thereon, said blocks being characterized as having an upright member and a hook-shaped base lug, disposed outmost with relation to the upright, an attachment arm adapted to overhang the upright and to be engaged thereby and to interlock with the lug at the base thereof, said attachment arm having a bifurcated portion adapted to straddle the upright and the lug.

3. In a device of the character described, an attachment arm comprising a hooked end portion, a bifurcated portion formed as a continuation thereof, a fulcrum pin spanning the space between said bifurcated portion adjacent its ends, and a web member spanning the space between said bifurcated portion adjacent the crotch thereof.

4. In combination with a tire changing machine having movable blocks characterized as being formed with an upright member thereon having an overhanging lip and a hook element at the base of said block, an attachment arm comprising a rigid structure bifurcated at one end and formed with a transverse pin to be engaged by the hook member, and a second transverse member to be engaged by the lip of the upright, said structure continuing in a gripping arm overhanging the end of the upright and carrying an upwardly presented hook at its end.

HARRY J. BERNHARD.